US011474270B2

(12) United States Patent
Liu et al.

(10) Patent No.: US 11,474,270 B2
(45) Date of Patent: Oct. 18, 2022

(54) THREE-COMPONENT SEISMIC DATA ACQUISITION WHILE FRACKING

(71) Applicant: Saudi Arabian Oil Company, Dhahran (SA)

(72) Inventors: Yujin Liu, Al Khobar (SA); Yue Du, Al Khobar (SA); Tong Wang Fei, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/140,285

(22) Filed: Jan. 4, 2021

(65) Prior Publication Data

US 2022/0214467 A1 Jul. 7, 2022

(51) Int. Cl.
*E21B 43/36* (2006.01)
*E21B 47/107* (2012.01)
*G01V 1/42* (2006.01)
*E21B 47/16* (2006.01)
*E21B 43/26* (2006.01)

(52) U.S. Cl.
CPC .............. *G01V 1/42* (2013.01); *E21B 47/107* (2020.05); *E21B 47/16* (2013.01); *E21B 43/2607* (2020.05)

(58) Field of Classification Search
CPC ........ E21B 43/26; E21B 47/06; E21B 47/095; E21B 47/107; G01V 2210/1234
See application file for complete search history.

(56) References Cited

U.S. PATENT DOCUMENTS

| 4,211,106 A | 7/1980 | Swanson |
| 4,648,261 A | 3/1987 | Thompson et al. |
| 4,858,130 A * | 8/1989 | Widrow ................. E21B 43/26 |
| | | 702/11 |
| 5,093,811 A * | 3/1992 | Mellor ..................... G01V 1/44 |
| | | 73/152.58 |

(Continued)

FOREIGN PATENT DOCUMENTS

WO WO 2020127302 6/2020

OTHER PUBLICATIONS

Carey et al., "Analysis of water hammer signatures for fracture diagnostics" Presented at the SPE Annual Technical Conference and Exhibition, Society of Petroleum Engineers, 2015, 25 pages.

(Continued)

*Primary Examiner* — Kipp C Wallace
(74) *Attorney, Agent, or Firm* — Fish & Richardson P.C.

(57) ABSTRACT

An acquisition system is configured to acquire seismic data representing a subsurface formation during a fracking process. The system includes at least one acoustic sensor that is configured to obtain vibration data representing vibrations relating to three orthogonal directions relative to the at least one acoustic sensor. The system is configured to receive the vibration data from the at least one acoustic sensor, identify one or more resonance frequencies represented in the vibration data, determine, based on the identified one or more resonance frequencies, a stage of a fracking process being performed, identify, based on the stage of the fracking process that is identified, a feature of one or more fractures in a borehole that is configured for the fracking process, and generate a seismic image of the subsurface formation based on the feature of the one or more fractures.

18 Claims, 7 Drawing Sheets

(56) References Cited

U.S. PATENT DOCUMENTS

| | | | | |
|---|---|---|---|---|
| 5,408,441 | A * | 4/1995 | Barr | G01V 1/36 |
| | | | | 181/101 |
| 8,635,907 | B2 | 1/2014 | Bakulin | |
| 9,127,543 | B2 | 9/2015 | Beasley | |
| 9,140,102 | B2 | 9/2015 | Bartko et al. | |
| 9,169,707 | B1 * | 10/2015 | Gilstad | E21B 4/14 |
| 9,347,313 | B2 * | 5/2016 | Wills | E21B 47/085 |
| 9,506,339 | B2 | 11/2016 | Beasley | |
| 10,641,090 | B2 | 5/2020 | Felkl et al. | |
| 2002/0044498 | A1 * | 4/2002 | Krebs | G01V 1/42 |
| | | | | 367/27 |
| 2007/0215345 | A1 | 9/2007 | Lafferty et al. | |
| 2013/0215712 | A1 | 8/2013 | Geiser et al. | |
| 2014/0202687 | A1 * | 7/2014 | Dorovsky | E21B 43/26 |
| | | | | 166/250.1 |
| 2017/0218753 | A1 * | 8/2017 | Nguyen | E21B 49/00 |
| 2018/0094521 | A1 | 4/2018 | Adamopoulos et al. | |
| 2018/0320514 | A1 | 11/2018 | Felkl et al. | |
| 2019/0162871 | A1 * | 5/2019 | Dell | E21B 47/06 |
| 2019/0178070 | A1 | 6/2019 | Hilpert et al. | |
| 2019/0310386 | A1 * | 10/2019 | Quan | G01V 1/306 |
| 2020/0309982 | A1 | 10/2020 | Jin et al. | |
| 2021/0054736 | A1 * | 2/2021 | Moos | E21B 43/12 |
| 2021/0301657 | A1 * | 9/2021 | Gordon | E21B 49/008 |

OTHER PUBLICATIONS

Dunham et al., "Hydraulic fracture conductivity inferred from tube wave reflections" In SEG Technical Program Expanded Abstracts 2017, 947-952, 6 pages.

Liang et al., "Hydraulic fracture diagnostics from Kraukliswave resonance and tube-wave reflections" Geophysics, 82(3): 2017, D171-D186, 16 pages.

Pittman, "Relationship of Porosity and Permeability to Various Parameters Derived from Mercury Injection-Capillary Pressure Curve for Sandstone" AAPG Bulletin, 1992, 8 pages.

Tang et al., "A dynamic model for fluid flow in open borehole fractures" Journal of Geophysical Research: Solid Earth, 94, 1989, 7567-7576, 10 pages.

PCT International Search Report and Written Opinion in International Appln. No. PCT/US2021/065786, dated Apr. 7, 2022, 18 pages.

* cited by examiner

THREE-COMPONENT SEISMIC DATA ACQUISITION WHILE FRACKING

TECHNICAL FIELD

The present disclosure generally relates to seismic data acquisition.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications, for example, identification of potential petroleum reservoirs. Seismic surveys are conducted by using a controlled seismic source (for example, a seismic vibrator or dynamite) to create seismic waves. The seismic source is typically located at ground surface. Seismic body waves travel into the ground, are reflected by subsurface formations, and return to the surface where they recorded by sensors called geophones. Seismic surface waves travel along the ground surface and diminish as they get further from the surface. Seismic surface waves travel more slowly than seismic body waves. The geologists and geophysicists analyze the time it takes for the seismic body waves to reflect off subsurface formations and return to the surface to map sedimentary facies and other geologic features. Similarly, analysis of the time it takes seismic surface waves to travel from source to sensor can provide information about near surface features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

Hydraulic fracturing, also referred to as fracking, is a well stimulation technique involving the fracturing of bedrock formations by a pressurized liquid. This specification describes seismic data acquisition in the context of Seismic While Fracking (SWF). SWF includes a seismic technique to evaluate the quality of hydraulic fractures during the fracking treatment. SWF includes gathering data from seismic signals in a subsurface environment. Generally, the seismic signals include diffracted body waves of acoustic seismic signals. SWF includes determining fracture information in the subsurface from the diffracted body waves.

The energy of the diffracted body waves dissipates relatively quickly with respect to a distance between the diffraction location and one or more seismic sensors measuring the diffractions of the body waves. As a result, the diffracted body waves can be too weak a signal for being recorded by the one or more seismic sensors in order to differentiate the signal from random noise. To distinguish the seismic signal in the received diffracted body waves, a wide-azimuth geometry can be used for the seismic sensors. Additionally, the sensors are configured to include a dense three dimensional (3D) acquisition geometry. As a result of this hardware configuration, a cost for acquiring the seismic signal from the diffracted body waves is relatively high.

To measure the seismic signal without using an expensive array of seismic sensors, an acquisition system and a measurement method is used to record seismic data including reflected tube waves, rather than body waves. The reflected tube waves are generated from guided waves that are generated during the fracking process. This acquisition system deploys one to several three-component sensors (such as geophones) outside of a wellhead to record a response of reflected tube waves from the fractures. The frequency spectra of recorded waveforms by the three-component sensors are generally representative of the respective hydraulic fracturing curves.

In a general aspect, an acquisition system is configured to acquire seismic data representing a subsurface formation during a fracking process. The system includes at least one acoustic sensor that is configured to obtain vibration data representing vibrations relating to three orthogonal directions relative to the at least one acoustic sensor. The system includes a processing device in communication with the at least one acoustic sensor, the processing device configured to perform operations. The operations include receiving the vibration data from the at least one acoustic sensor. The operations include identifying one or more resonance frequencies represented in the vibration data. The operations include determining, based on the identified one or more resonance frequencies, a stage of a fracking process being performed. The operations include identifying, based on the stage of the fracking process that is identified, a feature of one or more fractures in a borehole that is configured for the fracking process. The operations include generating a seismic image of the subsurface formation based on the feature of the one or more fractures.

In some implementations, the feature comprises a conductivity of the one or more fractures. In some implementations, the at least one acoustic sensor is coupled to a wellhead of the borehole that is configured for the fracking process. In some implementations, the seismic signal comprises one or more reflected tube waves that are generated from performing the fracking process. In some implementations, the at least one acoustic sensor has a sensitivity of greater than 1 Volt/meter/second (V/m/s) at a frequency of 1 Hertz (1 Hz) or greater.

In some implementations, the operations include streaming data representing the feature of the one or more fractures of the borehole to a remote system in real time or near real time, wherein additional seismic data are acquired and the streaming is continuously performed without interrupting the fracking process.

In some implementations, the operations include validating a data recording process of the stage of the fracking process based on the identified one or more resonance frequencies.

In a general aspect, a process for acquiring seismic data representing a subsurface formation during a fracking process includes receiving vibration data from at least one acoustic sensor that is configured to obtain vibration data representing vibrations relating to three orthogonal directions relative to the at least one acoustic sensor. The process includes identifying one or more resonance frequencies represented in the vibration data. The process includes determining, based on the identified one or more resonance frequencies, a stage of a fracking process being performed. The process includes identifying, based on the stage of the fracking process that is identified, a feature of one or more fractures in a borehole that is configured for the fracking process. The process includes generating a seismic image of the subsurface formation based on the feature of the one or more fractures.

In some implementations, the feature comprises a conductivity of the one or more fractures. In some implementations, the at least one acoustic sensor is coupled to a wellhead of the borehole that is configured for the fracking process. In some implementations, the seismic signal comprises one or more reflected tube waves that are generated from performing the fracking process. In some implementations, the at least one acoustic sensor has a sensitivity of greater than 1 Volt/meter/second (V/m/s) at a frequency of 1 Hertz (1 Hz) or greater.

In some implementations, the process includes streaming data representing the feature of the one or more fractures of the borehole to a remote system in real time or near real time, wherein additional seismic data are acquired and the streaming is continuously performed without interrupting the fracking process.

In some implementations, the process includes validating a data recording process of the stage of the fracking process based on the identified one or more resonance frequencies.

In a general aspect, one or more non-transitory computer readable media store instructions that, when executed by at least one processing device, cause the at least one processing device to perform operations. The operations include receiving the vibration data from the at least one acoustic sensor. The operations include identifying one or more resonance frequencies represented in the vibration data. The operations include determining, based on the identified one or more resonance frequencies, a stage of a fracking process being performed. The operations include identifying, based on the stage of the fracking process that is identified, a feature of one or more fractures in a borehole that is configured for the fracking process. The operations include generating a seismic image of the subsurface formation based on the feature of the one or more fractures.

In some implementations, the feature comprises a conductivity of the one or more fractures. In some implementations, the at least one acoustic sensor is coupled to a wellhead of the borehole that is configured for the fracking process. In some implementations, the seismic signal comprises one or more reflected tube waves that are generated from performing the fracking process. In some implementations, the at least one acoustic sensor has a sensitivity of greater than 1 Volt/meter/second (V/m/s) at a frequency of 1 Hertz (1 Hz) or greater.

In some implementations, the operations include streaming data representing the feature of the one or more fractures of the borehole to a remote system in real time or near real time, wherein additional seismic data are acquired and the streaming is continuously performed without interrupting the fracking process.

In some implementations, the operations include validating a data recording process of the stage of the fracking process based on the identified one or more resonance frequencies.

The embodiments described throughout this specification enable one or more of the following advantages. The three-component data acquisition method can be used for real-time monitoring of hydraulic fracturing. The acquired seismic data are representative of the hydraulic fracturing curves that are estimated from data gathered from dense 3D sensor arrays. The data footprint from the reduced number of sensors is relatively small when compared to data produced from dense 3D sensor arrays typically used for SWF. The smaller data footprint enables the data to be acquired in real-time or in near real time. In this specification, real-time data acquisition refers to data that can be acquired, analyzed, and presented close in time (within seconds or minutes) to when the data are generated from the subsurface. An operator of the systems described herein can thus make decisions responsive to the seismic data without delays. This eliminates reliance on previous fracking information, ongoing fracking measurements, and well loggings that are obtained during set intervals of different stages of fracking. The low data footprint also enables streaming (such as continuously broadcasting) of the seismic data to a remote location (such as a monitoring station) for remote processing.

Additionally, the SWF method and sensor described in this specification is capable of measuring very weak signals relative to conventional sensors. As previously described, the high-sensitivity of the sensor configuration enables fewer sensors to be deployed, lowering costs. The high sensitivity of the sensor improves the measurement of the signal response of the diffracted body waves, even at relatively long distances.

The details of one or more embodiments of these systems and methods are set forth in the accompanying drawings and the description to be presented. Other features, objects, and advantages of these systems and methods will be apparent from the description and drawings, and from the claims.

DETAILED DESCRIPTION

This specification describes an acquisition system for performing Seismic While Fracking (SWF) data acquisition. The acquisition system deploys at least one three-component sensor (such as a geophone) near a wellhead to record a response of reflected tube waves from fractures of a subsurface. Frequency spectra of recorded waveforms by the three-component sensor are representative of the respective hydraulic fracturing curves obtained from dense three-dimensional (3D) sensor arrays. The acquisition system is sensitive relative to sensors of the dense 3D sensor array. The acquisition system is configured to measure seismic signals a relatively far distance from the seismic refractions relative to the distance between the seismic refractions and dense 3D sensor arrays, even though energy of the seismic signal dissipates and the signal quality and signal strength is low relative to background noise. Thus, the acquisition system described in this specification is able to recover the seismic signals from fractures of a subsurface without a dense 3D sensor array.

The acquisition system uses fewer sensors than the dense 3D sensor arrays typically used for SWF data acquisition. The reduced count of sensors lowers costs for configuration the acquisition system relative to dense 3D sensor arrays. In addition, the reduced sensor count of the acquisition system enables less seismic data to be acquired for representing the fracturing curves in the subsurface region. The smaller footprint for the seismic data reduces an amount of processing for generating seismic images from the seismic data by a computing system of the acquisition system. Additionally, the seismic data can be streamed to remote computing systems for remote data processing. The seismic data can be streamed and/or processed for generating seismic images in real time or near real time. Here, real time processing refers to processing the seismic data as the data are generated and producing a result within seconds or minutes of the seismic data being generated. The near-immediate production of seismic images enables decision making for fracking operations based on seismic images representing the current status of the subsurface. For example, in some implementations, the system is configured to produce fracture conductivity information within seconds or minutes of seismic data processing.

Figure 1:
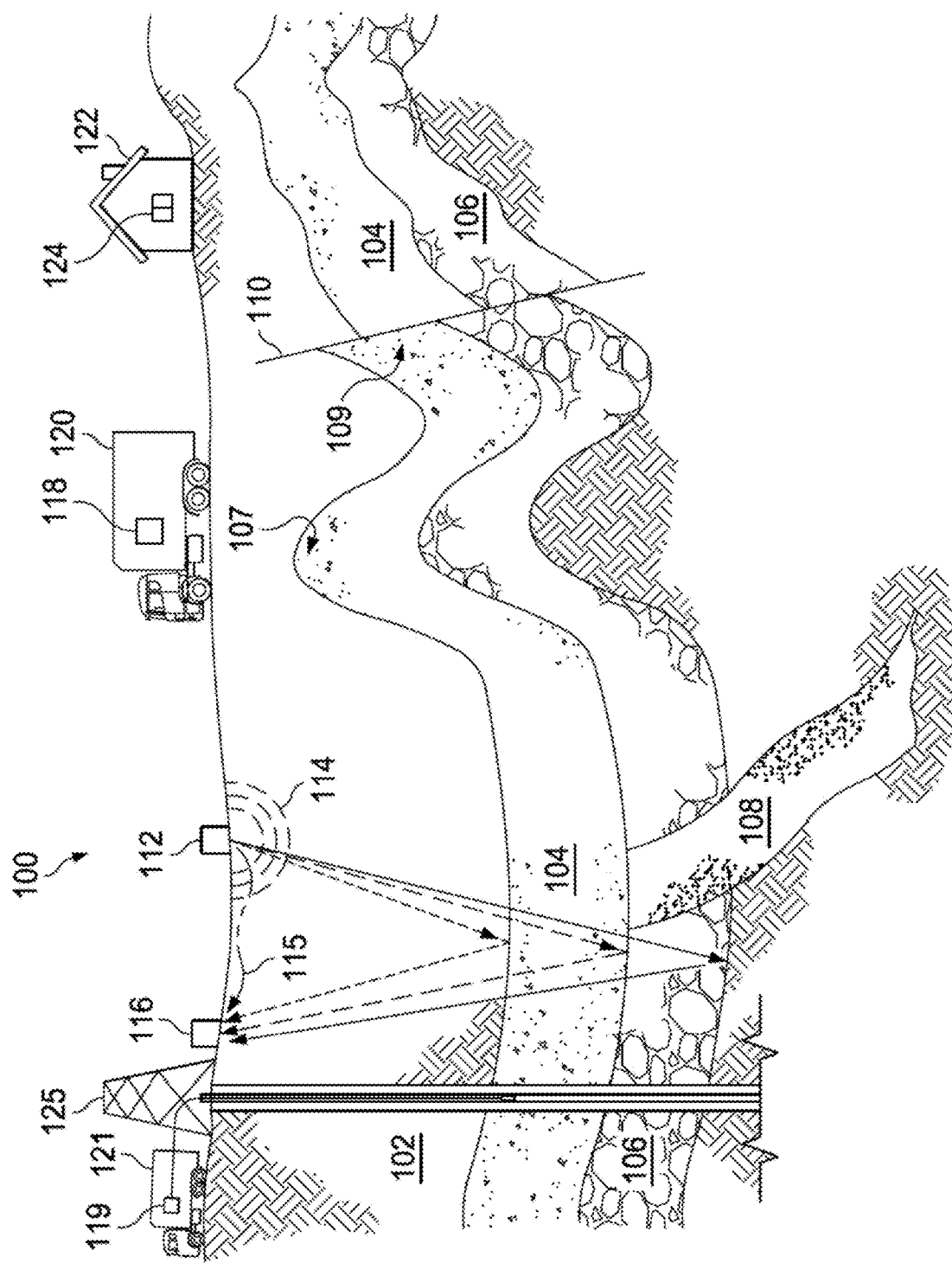
FIG. 1 is a schematic view of a seismic survey being performed to map subterranean features such as facies and faults.

FIG. 1 is a schematic view of a seismic survey being performed to map subterranean features such as facies and faults in a subterranean formation 100. FIG. 1 shows an example of acquiring seismic data using an active source 112, either in fracking or non-fracking contexts. As described below, this can be combined or replaced by measuring guided tube waves (shown in FIG. 2) that are generated by a fracking process. Thus, the seismic survey of FIG. 1 can include SWF data acquisition.

The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

In some contexts, such as shown in FIG. 1, an active seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface.

The velocity of these seismic waves depends properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

Figure 2:
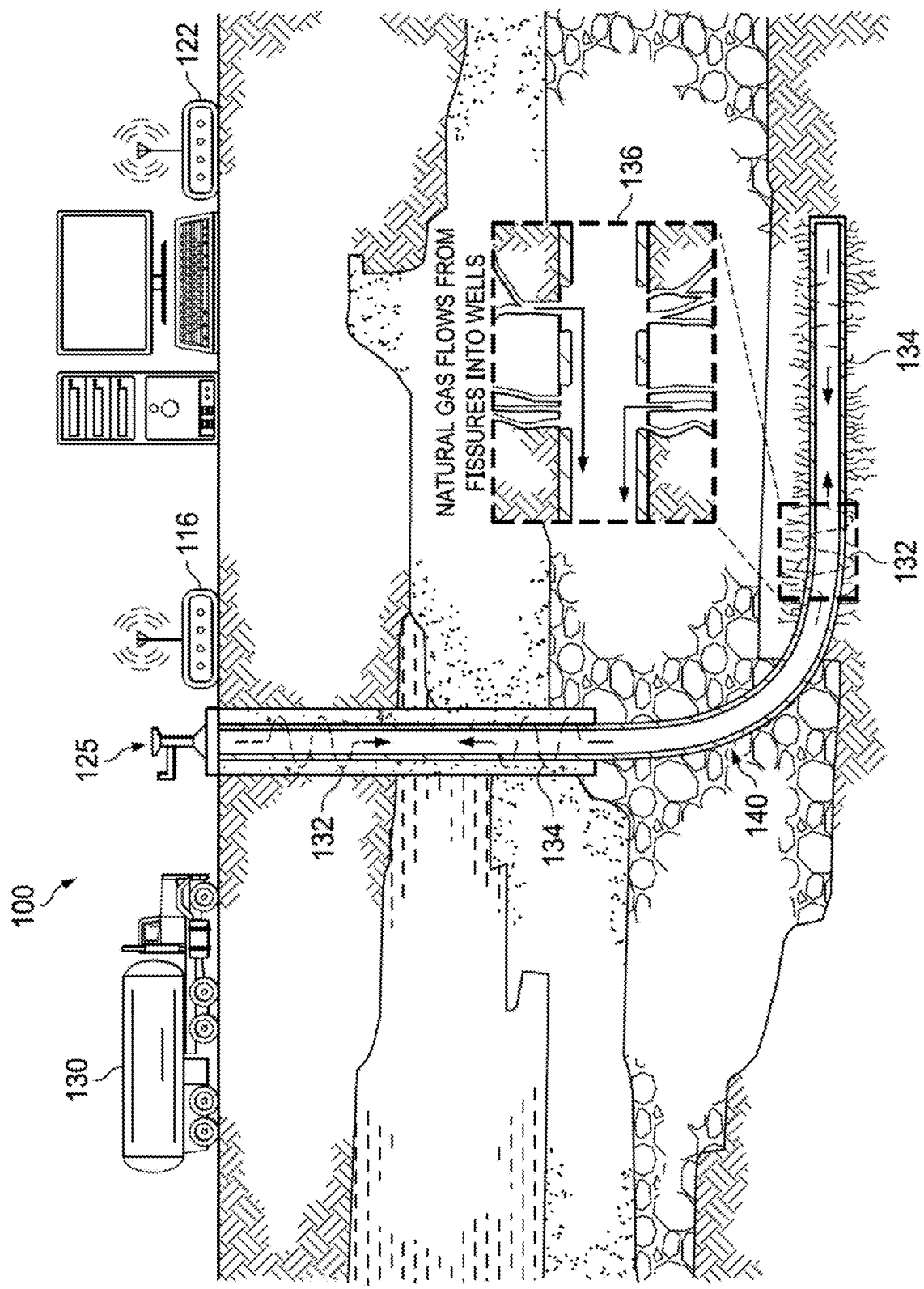
FIG. 2 illustrates a schematic view of a hydraulic fracturing environment.

During some fracking contexts, rather than an active source 114, a hydraulic fracturing fluid, such as water with minerals included, is pumped into the wellbore and is used to generate vibrations in the subsurface, as described in relation to FIG. 2. In some examples, the vibrations caused by the injection of the fluid can be used to obtain vibration data from the subsurface. This is a passive data acquisition approach. Rather than generating seismic body waves 114, the passive approach generates guided tube waves which are used to measure the fractures in the subsurface. In the context of FIG. 1, an active source 112 can be used to map the subsurface either individually or in combination with the passive sources.

The seismic waves 114 are received by a sensor or sensors 116. Although illustrated as a single component in FIG. 1, the sensor or sensors 116 generally include one to several three-component sensors that are position near a wellhead 125. An example configuration for the sensors 116 near the wellhead 125 is subsequently described in relation to FIG. 2. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot. The sensors 116 are generally housed in a modular unit on or near the wellhead. The recorded seismic data are transmitted to nearby processing center (such as center 122 subsequently described) using wireless transmission. Because the recorded seismic data includes only one or several channels, depending on the number of the sensors 116, the data size of the seismic data is very small relative to seismic data gathered from dense 3D sensor arrays typical for SWF contexts. This is true even after the sensors 116 are recording continuously for several days. Therefore, data processing and delivery are relatively efficient compared to data produced by the dense 3D sensor arrays. The smaller data size enables real-time monitoring of the hydraulic fractures of the environment 100.

The seismic surface waves 115 travel more slowly than seismic body waves 114. Analysis of the time it takes seismic surface waves 115 to travel from source to sensor can provide information about near surface features.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems that provide additional information about the subterranean formation. For example, the control center 122 can receive data from a computer 119 associated with a well logging unit 121. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

FIG. 2 illustrates an example of seismic survey using the acquisition system that is used in an SWF context. The environment 100 includes a wellbore 140 in which fracking fluid is injected. As shown in inset 136, the fracking fluid generates fissures in the subsurface, and natural gas or other materials flow from the fissures into the wellbore 140. Generally, a pumping truck 130 injects the fracking fluid into the wellbore 140.

When generating seismic data about the subsurface of environment 100, direct tube waves 132 are generated from a source 114. The direct tube waves 132 are guided waves that are generated during the fracking process. The direct tube waves are reflected in the wellbore 140 and back towards the wellhead 125. The reflected tube waves 134 are measured by the sensor 116 positioned on or near the wellhead 125. The one or several three-component sensors 116 are deployed outside the wellhead. The sensors 116 measure the reflected tube waves 134 at the wellhead 125. The sensors 116 transmit recorded data to a nearby processing center 125.

The sensor 116 is specially configured for measuring the reflected tube waves 134 at the wellhead 125. Generally, the sensor 116 is a three-component sensor that is configured to record three-component vibrations with relatively high sensitivity. The sensor 116 is very small and light, weighing less than 90 grams. The sensor includes a housing that enables the sensor 116 to be a modular addition to the wellbore 140. The housing also is waterproof. Generally, the sensor 116 includes a three-component accelerometer. A material is wrapped around the sensor 116 to waterproof it. With a cost-effective acquisition geometry, the seismic response from the hydraulic fractures is observed. It is possible to extract fracture data from the seismic observation. Because placing the sensor 116 in the wellhead, the sensor 116 is a portable sensor. The sensor 116 is as sensitive as a plurality of geophone sensors arranged in series (such as a dense 3D sensor array) that are typically used in SWF contexts. For example, the sensor 116 is configured with three-component accelerometers that are configured to record the reflected tube waves 134 from the wellbore. Because the reflected tube waves 134 vibrate along three directions, including each of the x-, y-, and z-directions (of a Cartesian coordinate system) with respect to an orientation of the accelerometers.

The three components that are recorded by the sensor 116 are utilized together to extract useful signals from the noisy data, resulting in more accurate evaluation of hydraulic fracturing. Generally, these three components are utilized together to extract the signal from the noisy data. For example, the frequency spectra of each component are first determined. These three frequency spectra are stacked to enhance the signal-to-noise ratio, as subsequently described. Fracture data are then extracted from the stacked frequency spectra. Performing these actions enables utilization, by the data acquisition system, of the three-component data to suppress noise included in the received reflected tube waves 134.

Figure 3:
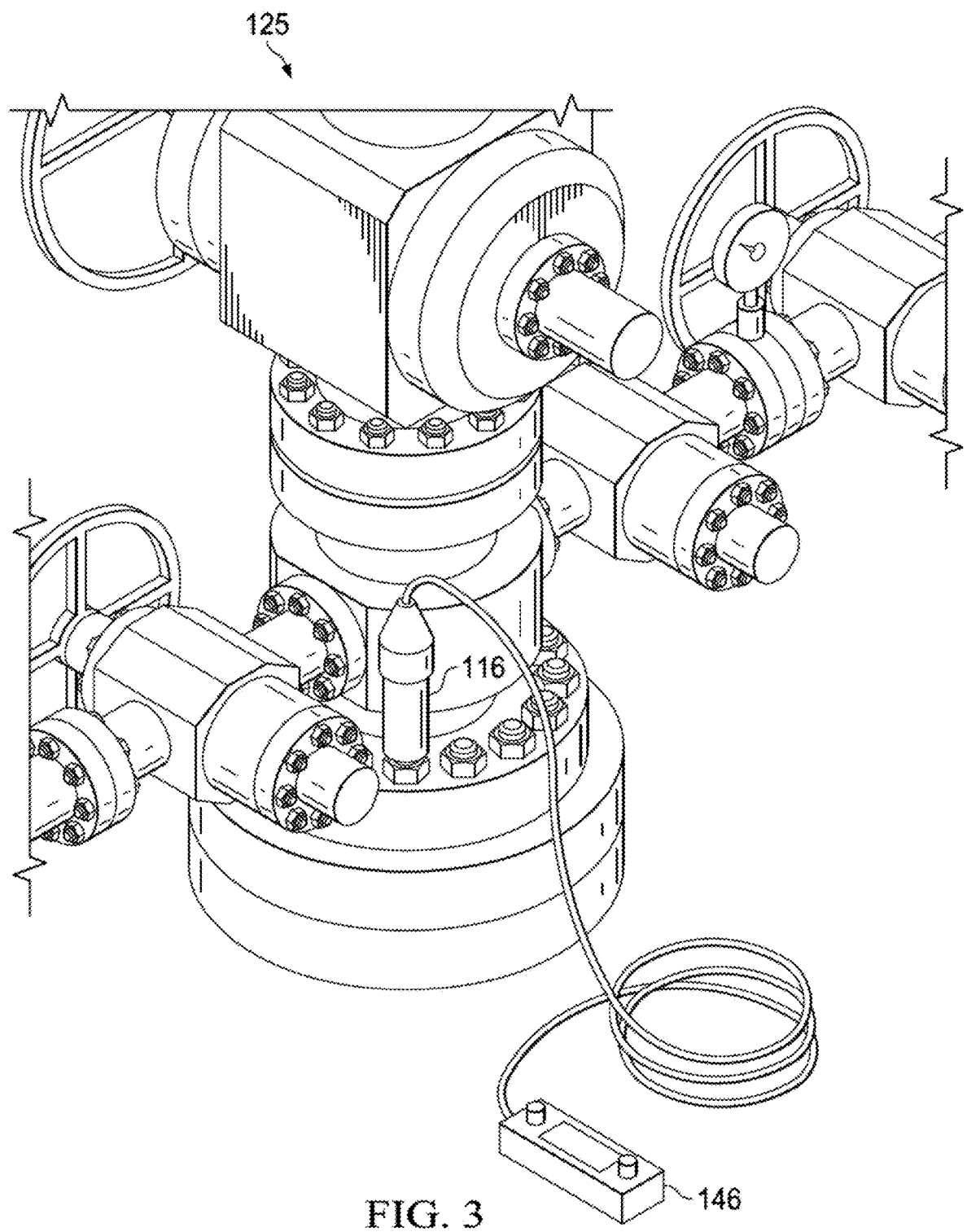
FIG. 3 illustrates an example of a sensor coupled to a wellhead.
Figure 4:
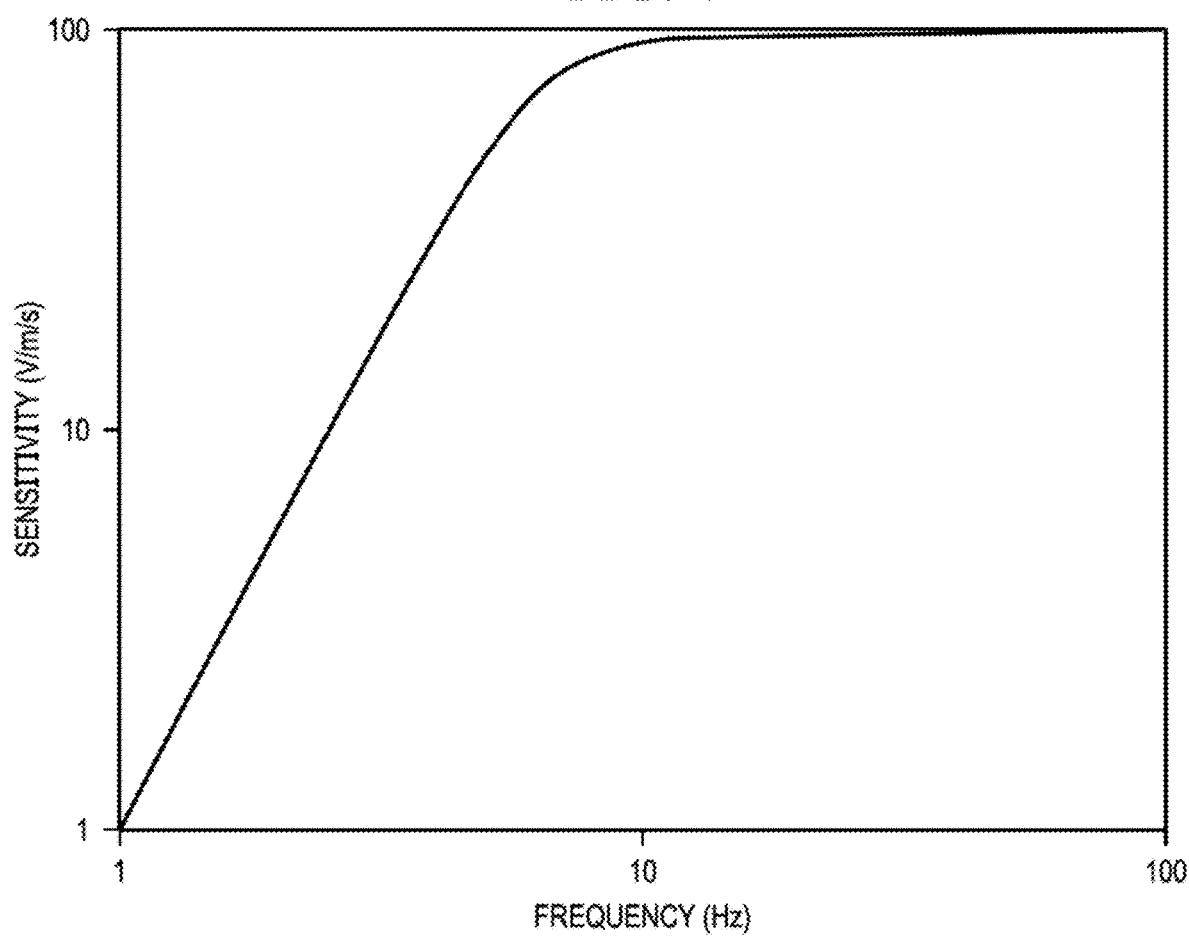
FIG. 4 is a graph that illustrates a response sensitivity for a three component sensor.

As shown in FIG. 3, the sensor 116 can be coupled to the exterior of the wellhead 125 and connected to a metal box, which mainly contains battery and memory electronics unit 146. Due to high portability of the sensor 116, the deployment needs negligible lay-out time and manpower. The sensor 116 can be coupled to the exterior of the wellhead 125 without specialized hardware. As previously described, the sensor has high sensitivity equating to as many as approximately 4 typical geophones in series. This high sensitivity allows the sensor 116 to record extremely weak signals from its placement on the wellhead 125 exterior. FIG. 4, subsequently described, shows an example frequency response of the sensor 116. The sensor 116 has a relatively high sensitivity even at 1 Hertz (Hz).

The analysis performed by the acquisition system is based a resonance analysis of the reflected tube waves 134. The sensor 116 is configured to record tube waves 134 reflected from the hydraulic fractures. The physical reaction is described as follows. During a stimulation process, tube waves 132 are first generated by a water hammer. The water hammer is induced by abrupt changes in a pumping rate by the truck 130, or impulsively modulating the volumetric flow rate. The direct tube waves 132 travel from the wellhead 125 to the set of fractures or packers 136. The tube waves 134 are reflected back to the surface. The direct tube waves 132 reflect again at the surface. This propagation procedure leads to successive arrivals, such as multiples, in a time domain. The multiples are generally separated by a two-way travel time between the wellhead 125 and fractures 136. This is called the resonance frequency. The acquisition system utilizes the measured resonance frequencies in the well 140 to estimate a conductivity of fractures 136 in the subsurface. Additionally, the waves transmitted into fractures 136 are reflected multiple times. Therefore, the reflected tube waves contain information from the fractures 136, such as the formation of the fractures. For example, the resonance frequencies of the reflected tube waves 134 indicate a conductivity of the fractures 136. As described, generally, the system is configured estimates fracture conductivity from the resonance frequencies. This data depends on the permeability of the medium, the degree of saturation, and the density and viscosity of the fluid being used. The resonance analysis provides a parameter of fracture conductivity that evaluates how easily fluid moves through the fractures. This data can be used to estimate fracture structure in subsequent calculations.

The use of the resonance frequency can enable the acquisition system to avoid adding an active source (such as source 114) into the fracturing process. This can reduce the cost of data acquisition and reduce interruptions to the fracturing process.

As previously stated, the analysis performed by the acquisition system is based a resonance analysis of the reflected tube waves 134. This in contrast to data acquisition based on simulations of hammer pressure signals. The resonance analysis of the acquisition system does not depend highly on accuracy of simulations, such as the simulation of hammer propagation data. Simulations of the hammer propagation data can include inaccuracies which distort the analysis of the signals. The resonance analysis performed does not require high accuracy simulations to result in accurate analysis. In addition, the resonance analysis by the acquisition system accounts for the effects of noise in the data, which can be a dominant factor in field applications of the analysis. Therefore, the resonance analysis performed by the acquisition system is more robust than hammer propagation simulation approaches for modeling tube reflection waves.

The acquisition system is configured to deploy the sensor at the wellhead 125, rather than downhole. The acquisition system can include the sensor 116 at the wellhead 125 because of the increased sensitivity of the sensor, as previously described. This reduces cost and setup time required for downhole sensor configurations.

Turning to FIG. 4, a graph 400 illustrates an example output frequency response of a sensor (such as sensor 116 of FIGS. 1-3). Even though the data are recorded at a high sampling rate, the data acquisition system generally analyses signals with frequencies less than ~4 Hz. The data are examined in both a time domain and a frequency domain. The graph 400 shows that the sensitivity of the sensor, in volts output per meter per second (V per m/s) is high (over 1 volt) near 1 Hz, and increases to near 100V at 10 Hz. Thus, the sensor is sensitive to measure resonance of the tube waves at the wellhead 125. The sensor does not need to be inserted into the wellbore 140, which disrupts the fracturing process and is time consuming.

Figure 5:
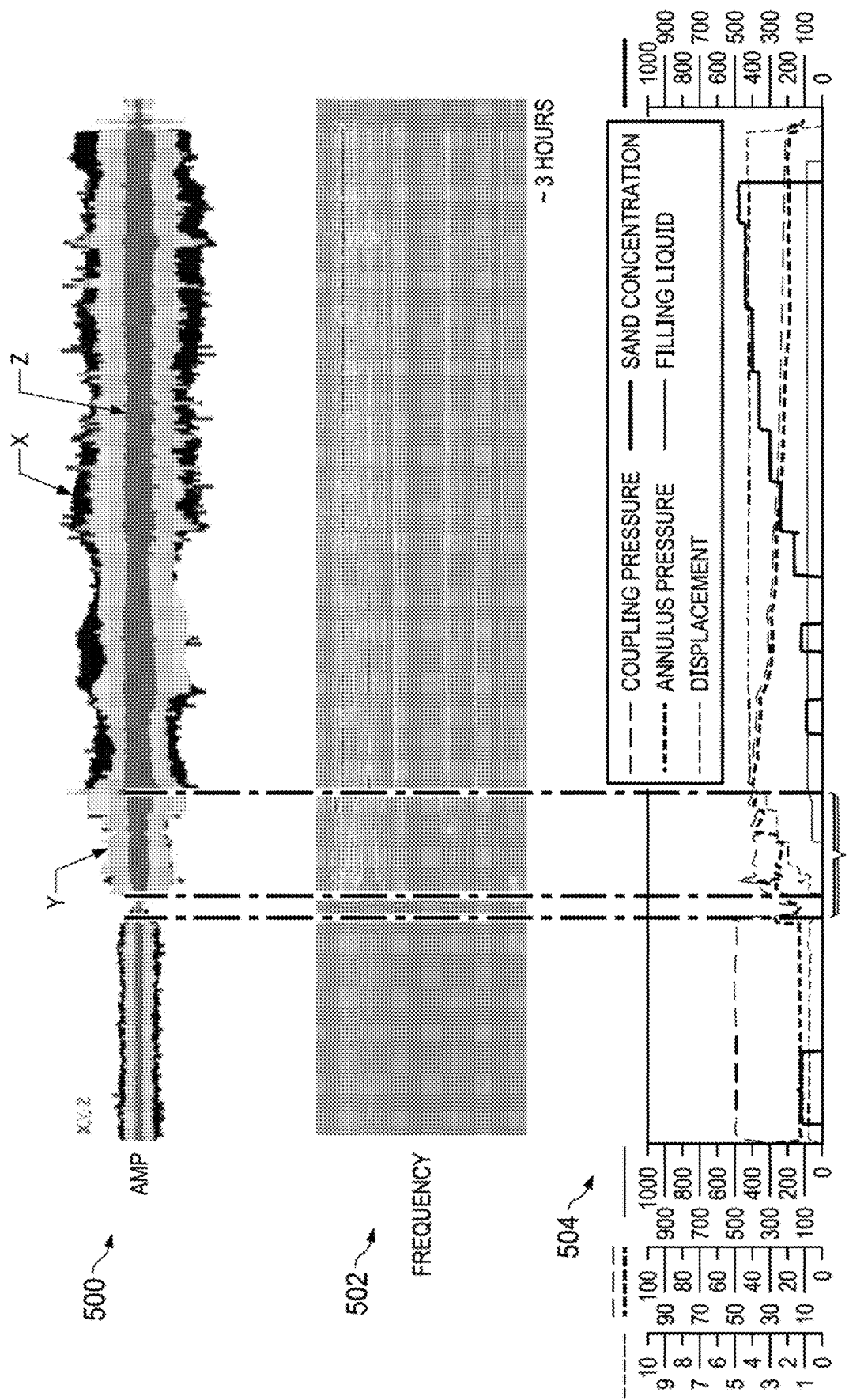
FIG. 5 illustrates example data comparing measured vibrations from a three component sensor to stages of a fracking process.

FIG. 5 shows example data recorded by the sensor (such as sensor 116 of FIGS. 1-4). The sensor records component acceleration data 500 including three components that correspond to accelerations in x-, y- and z-directions, respectively, relative to an orientation of the sensor in the environment 100. Since the tube waves 136 are reflected multiple times, the data 500 includes multiples in the time domain. In the frequency domain, the spectra of the reflected tube waves are characterized by multiple peaks associated with the resonant modes of the borehole-fracture system. From time-frequency analysis 502, there are different stages (denoted by dashed lines 506) with different behaviors of resonance frequencies during the whole procedure of hydraulic fracturing. The stages can include coupling pressure application, annulus pressure application, displacement, sand concentration, and filing the borehole with liquid. The stages of the fracking process can be identified from the fracking curves 504 of FIG. 5. The recorded seismic data match very well with the fracking curves. This result is used as a validation of the effectiveness of data recording. The dash lines are identified from the fracking curves 504. Compared with the fracturing curves 504, the behavior of resonance frequencies matches well with the fracturing curves. This demonstrates that the recorded signals contain reliable responses from the hydraulic fractures under the ground.

The acquisition system is configured to capture and analyze all three components captured by the three-component sensor to estimate more accurate and robust subsurface fracture information compared with the acquisition method using only single-component sensor. This approach is not limited to wellhead pressure time series sampled at approximately 1 Hz, which may be applicable for water hammer simulation analysis. This approach utilizes low-frequency signals (below ~4 Hz), which avoids the use of borehead logging tools using active sources. Generally, recording the tube waves outside of the wellhead can result in low signal-to-noise ratios.

Figure 6:
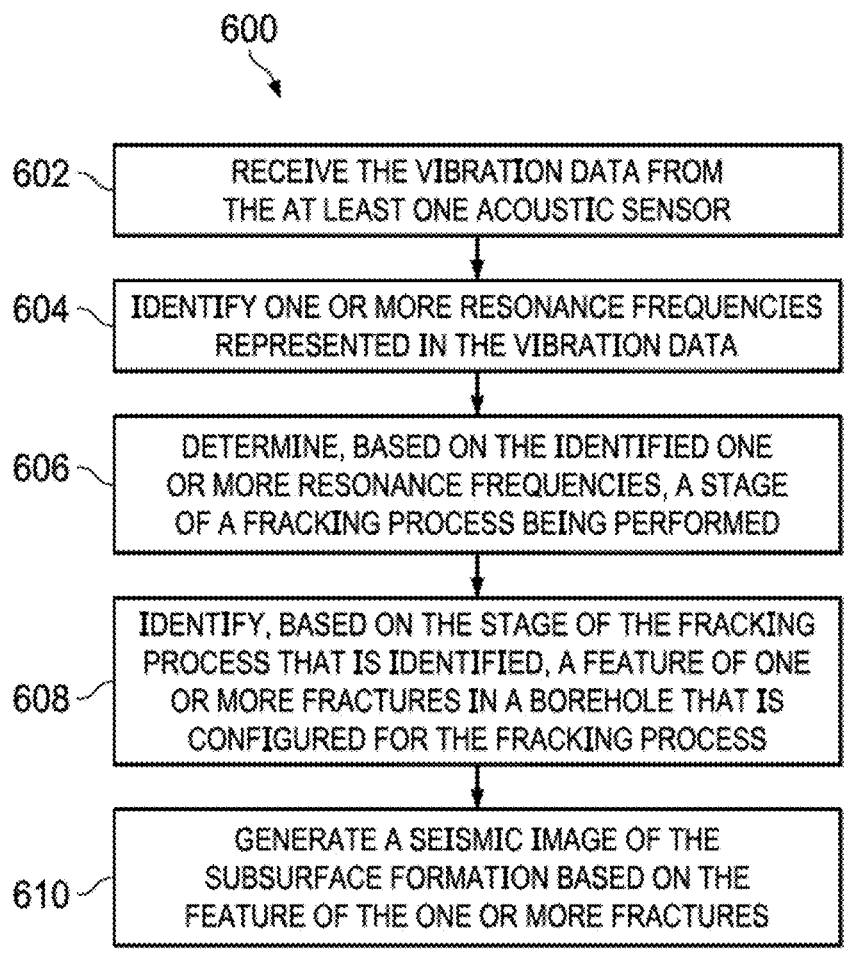
FIG. 6 is a flow diagram of an example process for acquiring seismic data during a fracking process.
Figure 7:
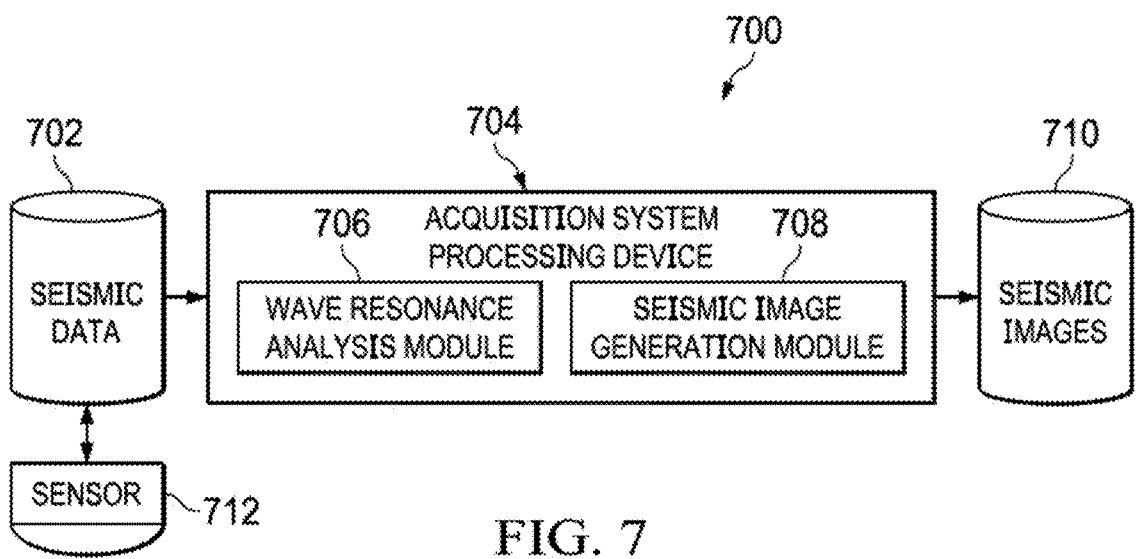
FIG. 7 is a block diagram of an example acquisition system implementing the process of FIG. 6.

Turning to FIGS. 6 and 7, a method 600 for acquiring seismic data in SWF contexts and an acquisition system 700 for performing the method 600 are shown. The method 600 includes obtaining, by at least one acoustic sensor 712, seismic data representing vibrations relating to three orthogonal directions relative to the at least one acoustic sensor, and storing the seismic data in a data store 702. An acquisition system processing device 704 of the acquisition system 700 is configured to receive (602) the vibration data from the at least one acoustic sensor 712. The acquisition system processing device 704 is configured to identify (604), by a wave resonance analysis module 706, one or more resonance frequencies represented in the vibration data. The acquisition system processing device 704 is configured to determine (606), based on the identified one or more resonance frequencies, a stage of a fracking process being performed, one or more resonance frequencies represented in the seismic data. The acquisition system processing device 704 is configured to identify (608), by the wave resonance analysis module 706, based on the stage of the fracking process that is identified, a feature of one or more fractures in a borehole that is configured for the fracking process. The acquisition system processing device 704 is configured to generate (610), by a seismic image generation module 708, a seismic image of the subsurface formation based on the feature of the one or more fractures. The seismic image can be stored in a data store 710 for use by one or more downstream applications.

Figure 8:
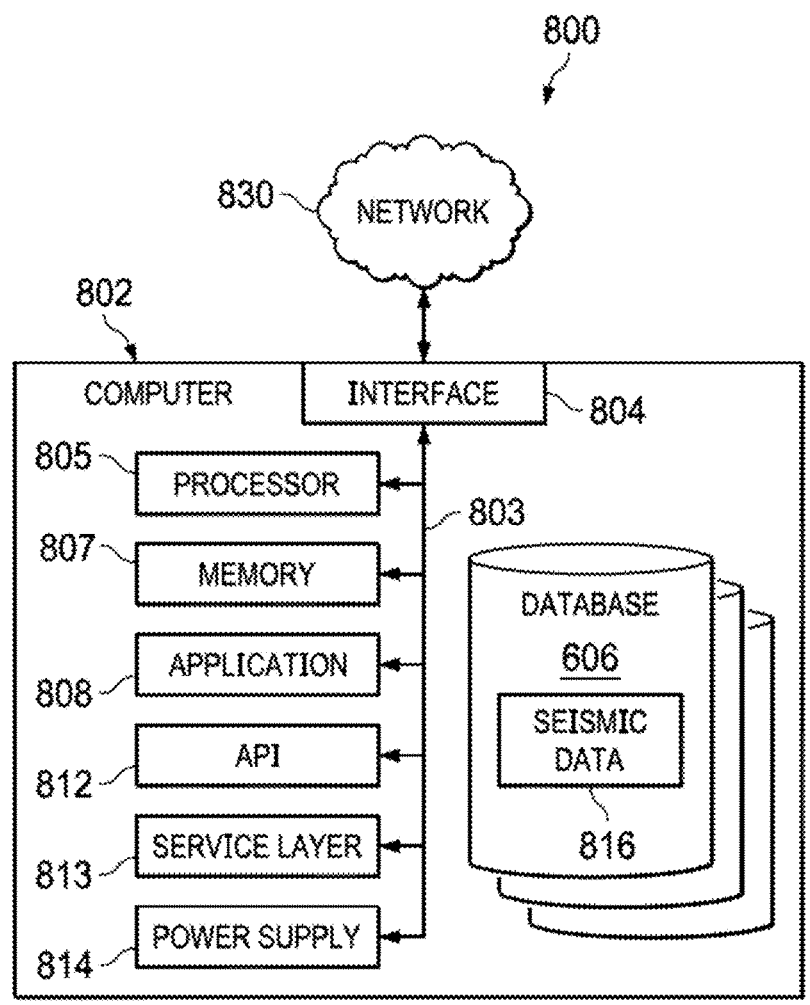
FIG. 8 is a block diagram illustrating an example computer system used to provide computational functionalities associated with described algorithms, methods, functions, processes, flows, and procedures as described in the present disclosure, according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830.

In some implementations, one or more components of the computer 802 can be configured to operate within different environments, including cloud-computing-based environments, local environments, global environments, and combinations of environments.

At a high level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the hardware of the interface can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data (for example, seismic data 816) for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. An acquisition system configured to acquire seismic data representing a subsurface formation during a fracking process, the system comprising:
   at least one acoustic sensor that is configured to obtain vibration data representing vibrations relating to three orthogonal directions relative to the at least one acoustic sensor; and
   a processing device in communication with the at least one acoustic sensor, the processing device configured to perform operations comprising:
      receiving the vibration data from the at least one acoustic sensor;
      identifying one or more resonance frequencies represented in the vibration data;
      determining, based on the identified one or more resonance frequencies, a stage of a fracking process being performed, wherein determining the stage of the fracking process comprises:
         receiving fracturing curves representing each of a coupling pressure application stage, an annulus pressure application stage, a displacement stage, a sand concentration, and a filling a borehole with liquid stage;
         identifying a behavior of the one or more resonance frequencies at a given time; and
         matching, based on the identified behavior, the one or more resonance frequencies to one of the fracturing curves representing the coupling pressure application stage, the annulus pressure application stage, the displacement stage, the sand concentration, or the filling the borehole with liquid stage;
      validating, based on the determined stage of the fracking process, a reliability of a data recording process of the stage of the fracking process based on the identified one or more resonance frequencies;
      determining, based on the validating, a feature of one or more fractures in the borehole that is configured for the fracking process; and
      generating a seismic image of the subsurface formation based on the feature of the one or more fractures.

2. The system of claim 1, wherein the feature comprises a conductivity of the one or more fractures.

3. The system of claim 1, wherein the at least one acoustic sensor is coupled to a wellhead of the borehole that is configured for the fracking process.

4. The system of claim 1, wherein the vibration data comprises one or more reflected tube waves that are generated from performing the fracking process.

5. The system of claim 1, wherein the at least one acoustic sensor has a sensitivity of greater than 1 Volt/meter/second (V/m/s) at a frequency of 1 Hertz (1 Hz) or greater.

6. The system of claim 1, the operations further comprising streaming data representing the feature of the one or more fractures of the borehole to a remote system in real time or near real time, wherein additional seismic data are acquired and the streaming is continuously performed without interrupting the fracking process.

7. The system of claim 1, wherein determining, based on the identified one or more resonance frequencies, a stage of a fracking process being performed comprises determining the stage of the fracking process in real-time while the stage of the fracking process is being performed, and
   validating the data recording process during performance of the stage of the fracking process.

8. A method for acquiring seismic data representing a subsurface formation during a fracking process, the method comprising:
   receiving vibration data from at least one acoustic sensor that is configured to obtain vibration data representing vibrations relating to three orthogonal directions relative to the at least one acoustic sensor;
   identifying one or more resonance frequencies represented in the vibration data;
   determining, based on the identified one or more resonance frequencies, a stage of a fracking process being performed, wherein determining the stage of the fracking process comprises:
      receiving fracturing curves representing each of a coupling pressure application stage, an annulus pressure application stage, a displacement stage, a sand concentration, and a filling a borehole with liquid stage;
      identifying a behavior of the one or more resonance frequencies at a given time; and
      matching, based on the identified behavior, the one or more resonance frequencies to one of the fracturing curves representing the coupling pressure application stage, the annulus pressure application stage, the displacement stage, the sand concentration, or the filling the borehole with liquid stage;
   validating, based on the determined stage of the fracking process, a reliability of a data recording process of the stage of the fracking process based on the identified one or more resonance frequencies;
   determining, based on the validating, a feature of one or more fractures in the borehole that is configured for the fracking process; and
   generating a seismic image of the subsurface formation based on the feature of the one or more fractures.

9. The method of claim 8, wherein the feature comprises a conductivity of the one or more fractures.

10. The method of claim 8, wherein the at least one acoustic sensor is coupled to a wellhead of the borehole that is configured for the fracking process.

11. The method of claim 8, wherein the vibration data comprises one or more reflected tube waves that are generated from performing the fracking process.

12. The method of claim 8, wherein the at least one acoustic sensor has a sensitivity of greater than 1 Volt/meter/second (V/m/s) at a frequency of 1 Hertz (1 Hz) or greater.

13. The method of claim 8, further comprising streaming data representing the feature of the one or more fractures of the borehole to a remote system in real time or near real time, wherein additional seismic data are acquired and the streaming is continuously performed without interrupting the fracking process.

14. One or more non-transitory computer readable media storing instructions that, when executed by at least one processing device, cause the at least one processing device to perform operations comprising:
   receiving vibration data from at least one acoustic sensor that is configured to obtain vibration data representing vibrations relating to three orthogonal directions relative to the at least one acoustic sensor;
   identifying one or more resonance frequencies represented in the vibration data;

determining, based on the identified one or more resonance frequencies, a stage of a fracking process being performed, wherein determining the stage of the fracking process comprises:
  receiving fracturing curves representing each of a coupling pressure application stage, an annulus pressure application stage, a displacement stage, a sand concentration, and a filling a borehole with liquid stage;
  identifying a behavior of the one or more resonance frequencies at a given time; and
  matching, based on the identified behavior, the one or more resonance frequencies to one of the fracturing curves representing the coupling pressure application stage, the annulus pressure application stage, the displacement stage, the sand concentration, or the filling the borehole with liquid stage;
validating, based on the determined stage of the fracking process, a reliability of a data recording process of the stage of the fracking process based on the identified one or more resonance frequencies;

determining, based on the validating, a feature of one or more fractures in the borehole that is configured for the fracking process; and generating a seismic image of a subsurface formation based on the feature of the one or more fractures.

15. The one or more non-transitory computer readable media of claim 14, wherein the feature comprises a conductivity of the one or more fractures.

16. The one or more non-transitory computer readable media of claim 14, wherein the at least one acoustic sensor is coupled to a wellhead of the borehole that is configured for the fracking process.

17. The one or more non-transitory computer readable media of claim 14, wherein the vibration data comprises one or more reflected tube waves that are generated from performing the fracking process.

18. The one or more non-transitory computer readable media of claim 14, wherein the at least one acoustic sensor has a sensitivity of greater than 1 Volt/meter/second (V/m/s) at a frequency of 1 Hertz (1 Hz) or greater.

* * * * *